United States Patent
Tucker et al.

(10) Patent No.: US 11,175,694 B2
(45) Date of Patent: Nov. 16, 2021

(54) METHOD AND DEVICE TO SUPPORT A DISPLAY OF AN ELECTRONIC DEVICE

(71) Applicant: Lenovo (Singapore) Pte. Ltd., New Tech Park (SG)

(72) Inventors: Matthew Ian Tucker, Chapel Hill, NC (US); Thomas Perelli, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 42 days.

(21) Appl. No.: 16/544,315

(22) Filed: Aug. 19, 2019

(65) Prior Publication Data
US 2021/0055758 A1 Feb. 25, 2021

(51) Int. Cl.
*G06F 1/16* (2006.01)
*F16M 11/20* (2006.01)
*F16M 11/10* (2006.01)

(52) U.S. Cl.
CPC ........... *G06F 1/1616* (2013.01); *F16M 11/10* (2013.01); *F16M 11/2064* (2013.01); *G06F 1/166* (2013.01); *G06F 1/1637* (2013.01); *G06F 1/1667* (2013.01); *G06F 1/1681* (2013.01); *G06F 1/1684* (2013.01)

(58) Field of Classification Search
None
See application file for complete search history.

(56) References Cited

U.S. PATENT DOCUMENTS 9,389,647 B2 * 7/2016 Hwang ................. G06F 1/1681
9,683,694 B2 * 6/2017 Shiba ..................... F16M 11/38

FOREIGN PATENT DOCUMENTS

WO    WO-2018226209 A1 * 12/2018 ........... H01F 7/0252

* cited by examiner

*Primary Examiner* — James Wu
*Assistant Examiner* — Christopher L Augustin
(74) *Attorney, Agent, or Firm* — The Small Patent Law Group LLC; Josef L. Hoffmann

(57) ABSTRACT

An electronic device is provided. The electronic device includes a display. The display includes a display surface and an opposed display back surface. A base is rotatably coupled to the display with a base hinge. The base includes an input surface and an opposed base bottom surface. The base hinge extends along an interface between the display and the base. A retractable standoff includes a standoff body having a standoff hinge to hingeably mount the standoff body to one of the display back surface or base bottom surface. The standoff hinge is moveable between a retracted position and extended position. The standoff body is flush with the display back surface or the base bottom surface when the retractable standoff is in the retracted position. The standoff body includes a standoff body outer edge to abut against another of the display back surface or the base bottom surface when the retractable standoff is in the extended position.

17 Claims, 9 Drawing Sheets

METHOD AND DEVICE TO SUPPORT A DISPLAY OF AN ELECTRONIC DEVICE

FIELD

The present disclosure relates generally to electronic devices that have retractable support structure.

BACKGROUND OF THE INVENTION

Personal computers (PCs) devices have become fundamental tools both in personal life and business. PC devices are easy to operate and simple to carry. However, the PC device offers different user experiences, which has led individuals to use other types of devices for different aspects of personal and business use. For example, using sketching and drawing feature with a convertible PC can be difficult. While the convertible PC display is capable of rotating 360° degrees and folding back over the keyboard, this flat position is not ideal for user operations like drawing. This results in a user having to use one hand to draw while tilting the convertible PC in a more comfortable drawing position with their other hand.

A need remains for improved methods and devices that overcome the disadvantages discussed above and other disadvantages in conventional systems that will become apparent herein. Specifically, a need remains for methods and devices that provide additional functionality for a convertible PC device.

SUMMARY

In accordance with embodiments herein, an electronic device is provided. The electronic device includes a display. The display includes a display surface and an opposed display back surface. A base is rotatably coupled to the display with a base hinge. The base includes an input surface and an opposed base bottom surface. The base hinge extends along an interface between the display and the base. A retractable standoff includes a standoff body having a standoff hinge to hingeably mount the standoff body to one of the display back surface or base bottom surface. The standoff hinge is moveable between a retracted position and extended position. The standoff body is flush with the display back surface or the base bottom surface when the retractable standoff is in the retracted position. The standoff body includes a standoff body outer edge to abut against another of the display back surface or the base bottom surface when the retractable standoff is in the extended position.

Optionally, the standoff body may include first and second standoff body portions. The standoff hinge may include first and second standoff hinge portions. The standoff body outer edge may include first and second standoff body outer edges. The second standoff hinge portion may hingeably mount the second standoff body portion to one of the display back surface or base bottom surface. The second standoff body outer edge may abut against another of the display back surface, the base bottom surface, or the first standoff body portion when in the extended position.

Optionally, the first standoff hinge portion is hingeably mounted to the display back surface and the second standoff hinge portion may be hingeably mounted to the base bottom surface. The first standoff body portion may be linearly moveable toward and away from the base hinge and the second standoff body portion may be linearly moveable toward and away from the base hinge. The second standoff body portion may be embedded within the display back surface or the base bottom surface when the retractable standoff is in the retracted position. The standoff body outer edge may include a flexible material that abuts against the another of the display back surface or base bottom surface. The flexible material may have an elastic modulus that may be less than an elastic modulus of material forming the standoff body.

Optionally, the flexible material may be rubber. In the extended position the standoff body outer edge may abut against the another of the display back surface or the base bottom surface to form an angle between the display and the base in a range between 15°-35° degrees. The display back surface or the base bottom surface may include a detent to receive the standoff body outer edge. The device may include at least one sensor positioned to detect an angle between the base and the display. One or more processors may be coupled to the at least one sensor to receive angle data from the at least one sensor. Responsive to execution of the program instructions, the one or more processors may perform in response to angle data indicative of the angle between the base and display being within a predetermined range, activating a sketch application.

Optionally, the predetermined range may be between 15 degrees and 35 degrees. The electronic device may include at least one sensor positioned to detect contact between the retractable standoff and the another of the display back surface or the base bottom surface. One or more processors may be coupled to the at least one sensor to receive contact data from the at least one sensor. Responsive to execution of the program instructions, the one or more processors may perform, in response to contact data indicative of the another of the display back surface or the base bottom surface contacting the retractable standoff, activating a sketch application.

In accordance with embodiments herein, an electronic device for sketching is provided. The device includes a display including a display surface and an opposed display back surface. A base rotatably is coupled to the display with a base hinge and includes an input surface and an opposed base bottom surface. the base hinge extends along an interface between the display and base. A retractable standoff includes a first standoff portion positioned adjacent the base hinge. The first standoff portion includes a first standoff body portion having a first standoff hinge portion hingeably mounted in one of the base or the display to move the first standoff portion from a retracted position to an extended position. A second standoff portion is positioned adjacent a base distal edge or display distal edge. The second standoff portion includes a second standoff body portion having a second standoff hinge portion hingeably mounted in one of the base or the display to move the second standoff portion from a retracted position to an extended position. The first standoff portion in the extended position engages the second standoff portion in the extended position to fix the first standoff portion as a predetermined angle. The first standoff portion includes a first standoff portion outer edge to abut against another of the display back surface or the base bottom surface.

Optionally, the device may comprise a first track disposed within one of the base or the display that may receive the first standoff portion to permit linear movement of the first standoff portion parallel to the base hinge. A second track may be disposed within one of the base or the display that may receive the second standoff portion to permit linear movement of the second standoff portion parallel to the base hinge. The device may comprise tabs secured to the first standoff portion for manual actuation of the first standoff portion within the track. The device may comprise one or more processors that execute directions to determine is the standoff is in an extended position and switch a mode of operation of the electronic device to a drawing mode. The one or more processors may execute directions to in response to switching the mode of operation to a drawing mode, display a graphic user interface.

In accordance with embodiments herein, an electronic device for sketching is provided. The device includes a display including a display surface and an opposed display back surface. A base is rotatably coupled to the display with a base hinge and includes an input surface and an opposed base bottom surface. The base hinge extends along an interface between the display and the base. A retractable standoff includes a first standoff portion positioned adjacent the base hinge including a first standoff body portion having a first standoff hinge portion rotatably coupled in one of the base or the display to move from a retracted position to an extended position. A second standoff portion is positioned adjacent a base distal edge or a display distal edge including a second standoff body portion having a second standoff hinge portion rotatably coupled in one of the base or the display to move from a retracted position to an extended position. The first standoff portion in the extended position engages the second standoff portion in the extended position to fix the second standoff portion at a predetermined angle. The second standoff portion includes a second standoff portion outer edge to abut against another of the display back surface or the base bottom surface in the extended position.

Optionally, the device may comprise one or more processors that execute directions to determine the first standoff portion is in an extended position and switch a mode of operation of the electronic device to a drawing mode based on the determination the first standoff portion is in the extended position. The first standoff portion may move laterally in relation to the second standoff portion parallel to the base hinge.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1A:
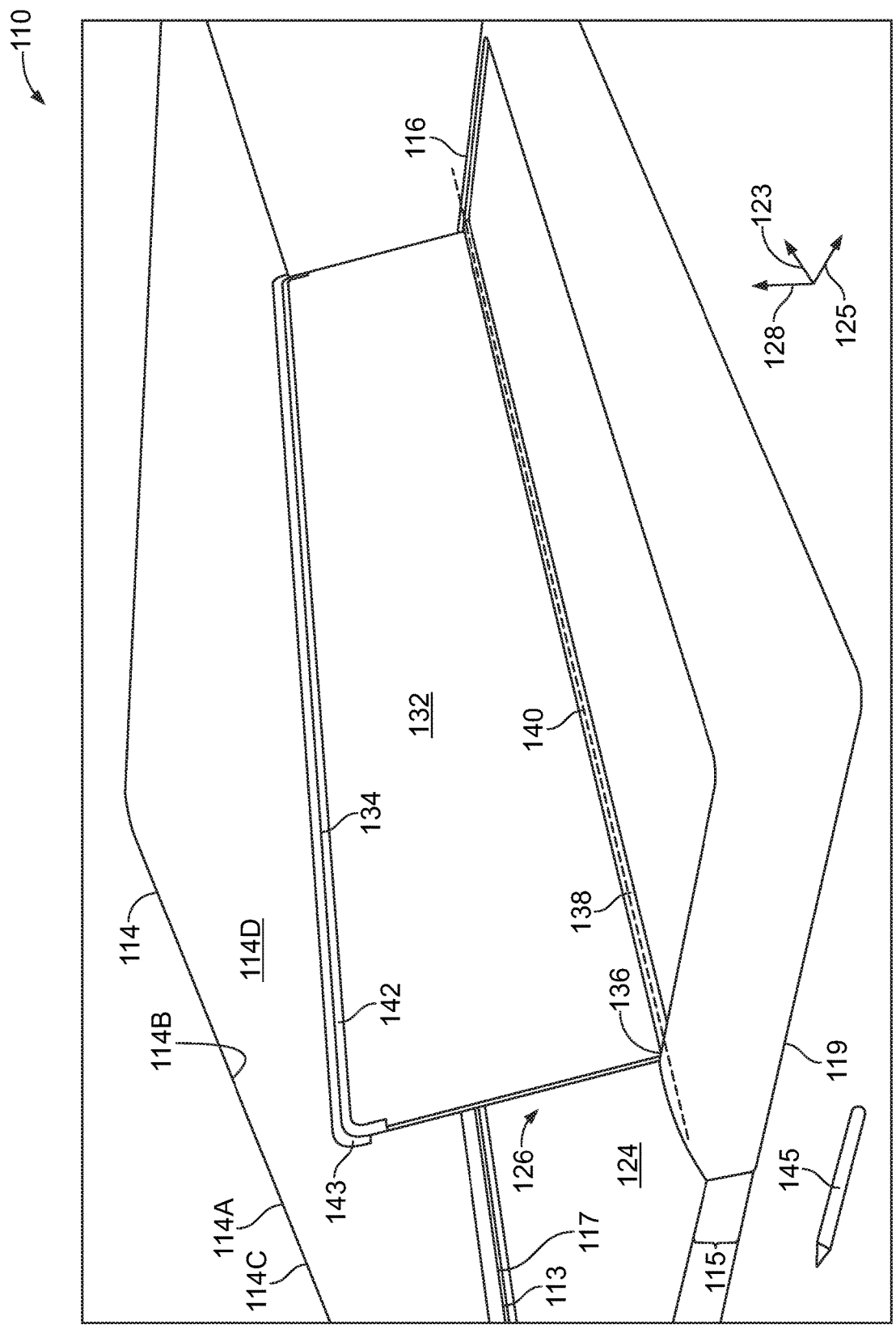
FIG. 1A is a back perspective view of an electronic device formed in accordance with embodiments herein.

Throughout the present description, the terms "vertical", "horizontal", and "lateral" shall define directions with respect to the display and keyboard of the device. The term "lateral" shall refer to a direction extending transversely across the user input region (e.g., from left to right or from right to left, with respect to a keyboard). In the example of FIG. 1A, the lateral direction is illustrated by lateral axis 123 which extends through the hinges 117. The term "vertical" shall refer to a direction extending outward from the user input (e.g., keyboard) such as in a direction non-parallel to the lateral direction. In the example of FIG. 1A, the vertical direction illustrated by the vertical axis 128 is oriented perpendicular to the lateral axis 123, with the vertical axis extending upward along the display 114. The term "horizontal" shall refer to a direction that is perpendicular to the "vertical" direction. The term "longitudinal" shall define a direction with respect to the keyboard of the device. The term "longitudinal" shall refer to a direction extending perpendicular to the lateral axis 123 and extending between the front and rear of the base. The longitudinal direction is illustrated by longitudinal axis 125 in FIG. 1A.

Figure 2A:
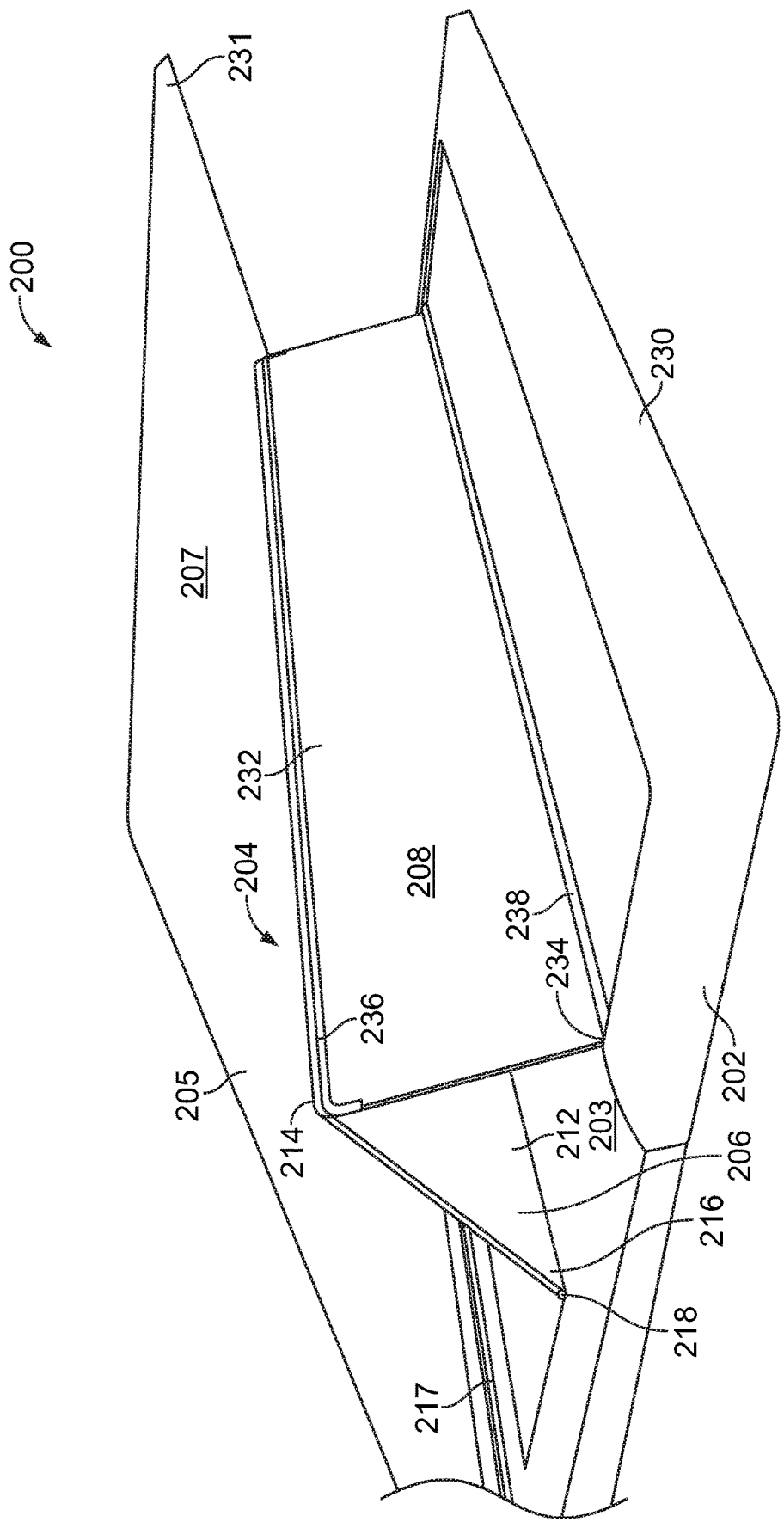
FIG. 2A is a back perspective view of an electronic device formed in accordance with embodiments herein.
Figure 3A:
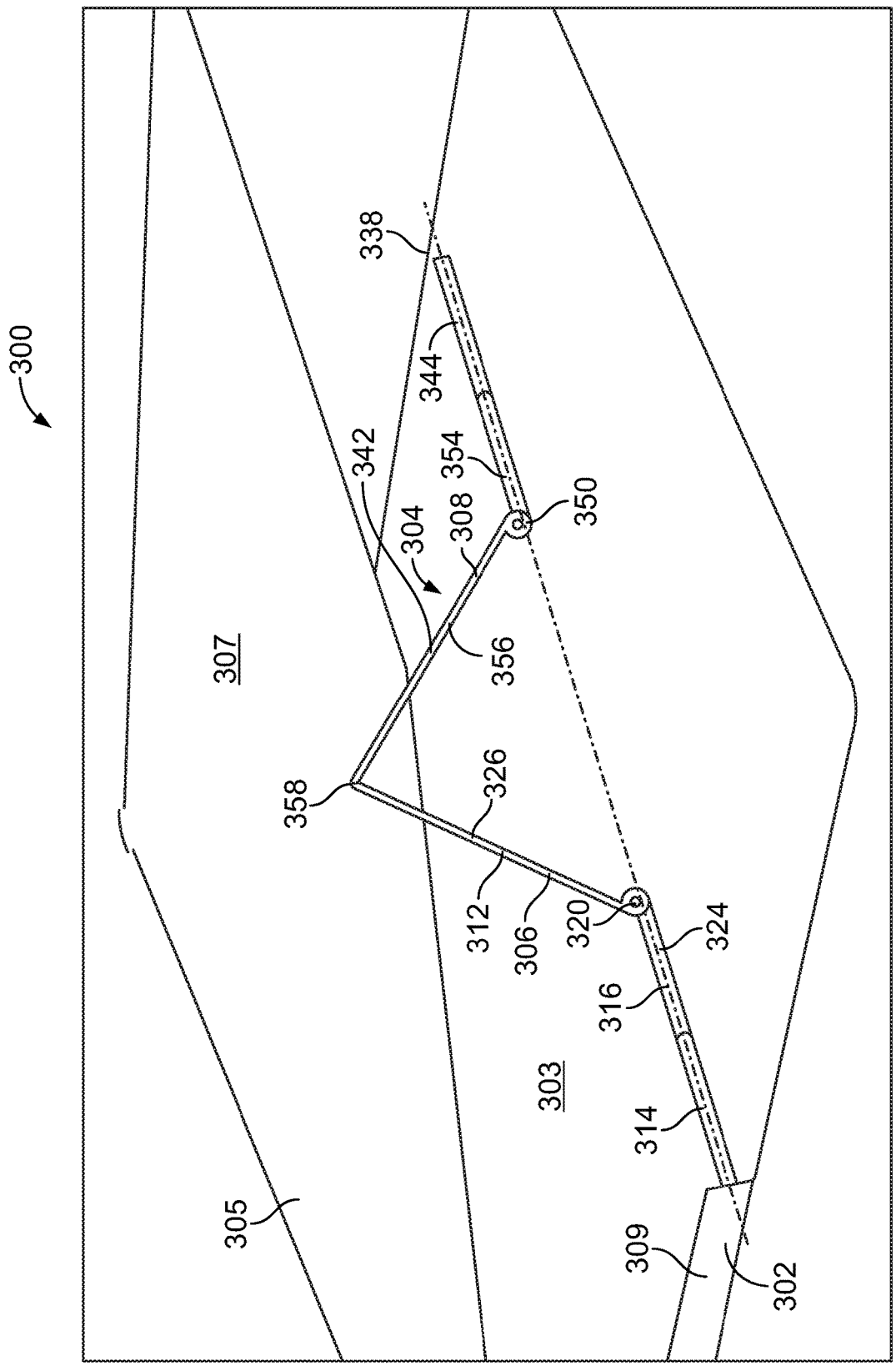
FIG. 3A is a back perspective view of an electronic device formed in accordance with embodiments herein.

Throughout the present description, the terms "upper", "lower", "top", "bottom", "left", "right", "front", "forward", "rear", and "rearward" shall define directions or orientations with respect to the base. It will be understood that for illustration purposes that FIG. 1A is a back view and that spatially relative terms are used from a front view with the display front surface 114C with the display screen facing a user and with the keyboard on a top surface of the base 116. FIGS. 2A and 3A similarly illustrate back views and spatially relative terms are used from a front view. It will be understood that the spatially relative terms "upper", "lower", "top", "bottom", "left", "right", "front", "forward", "rear", and "rearward" are intended to encompass different orientations of the electronic device in use or operation in addition to the orientation depicted in the Figures.

FIG. 1A is a back perspective view of an electronic device 110 formed according to an embodiment herein, showing a state where a display 114 is opened from a base 116 along a hinge 117 hingeably mounted between the display 114 and the base 116. While only one hinge 117 is illustrated in the example of FIG. 1A, in other examples, plural hinges along an interface 113 between the display 114 and base 116 may be provided. The hinge 117 enables the display 114 to be rotationally movable, relative to the base 116, between various open and collapsed positions. The hinge 117 may be constructed to enable the display 114 to rotate 360° relative to the base 116. For example, the display 114 may be rotated from the position illustrated in FIG. 1A to a closed position such that the display screen (not shown) closes against and faces the keyboard (not shown)(also referred to as a non-operative closed or storage position). In the example of FIG. 1A, the display 114 and base 116 are opened to be approximately 20° degree to each other in a drawing position. While the angle may be approximately 20° degrees in one example, in other examples, the drawing position includes angles in the range between 15°-35° degrees.

As a point of reference, when a user is positioned to directly face the front face of the display 114 with the keyboard in front of the display and positioned for typing, the display side closest to (and facing toward) the user is called the front side 114A (forward) and the side furthest away from (and facing away from) the user is called the rear side 114B (rearward). The front side 114A includes a display front surface 114C while the rear side 114B includes a display back surface 114D. The thickness 115 of the base 116 is defined with respect to the vertical direction 128, while the width is defined with respect to the lateral direction 123. The display 114 contains a display screen (not shown). The display screen may represent a touch sensitive screen.

The base 116 houses a keyboard, processor, memory, as well as other components based on the nature and functionality to be provided. The keyboard is positioned on the base top surface 119. The base 116 may be formed of a plastic material or other suitable material. A mouse touch pad may be built into the base adjacent the keyboard. In the illustration of FIG. 1A, because the base 116 is rotated in a position that forms an angle in the range between 15°-35° degrees with the display 114 allowing the display screen to face a user on the display front surface 114C, the base top surface 119 is on the bottom side of the base 116. In this manner the keyboard (not shown) is facing downward in the position of FIG. 1A. Similarly, the base left edges appear as right edges in FIG. 1A and base right edges appear as base left edges as a result of the illustrated back view.

Figure 1B:
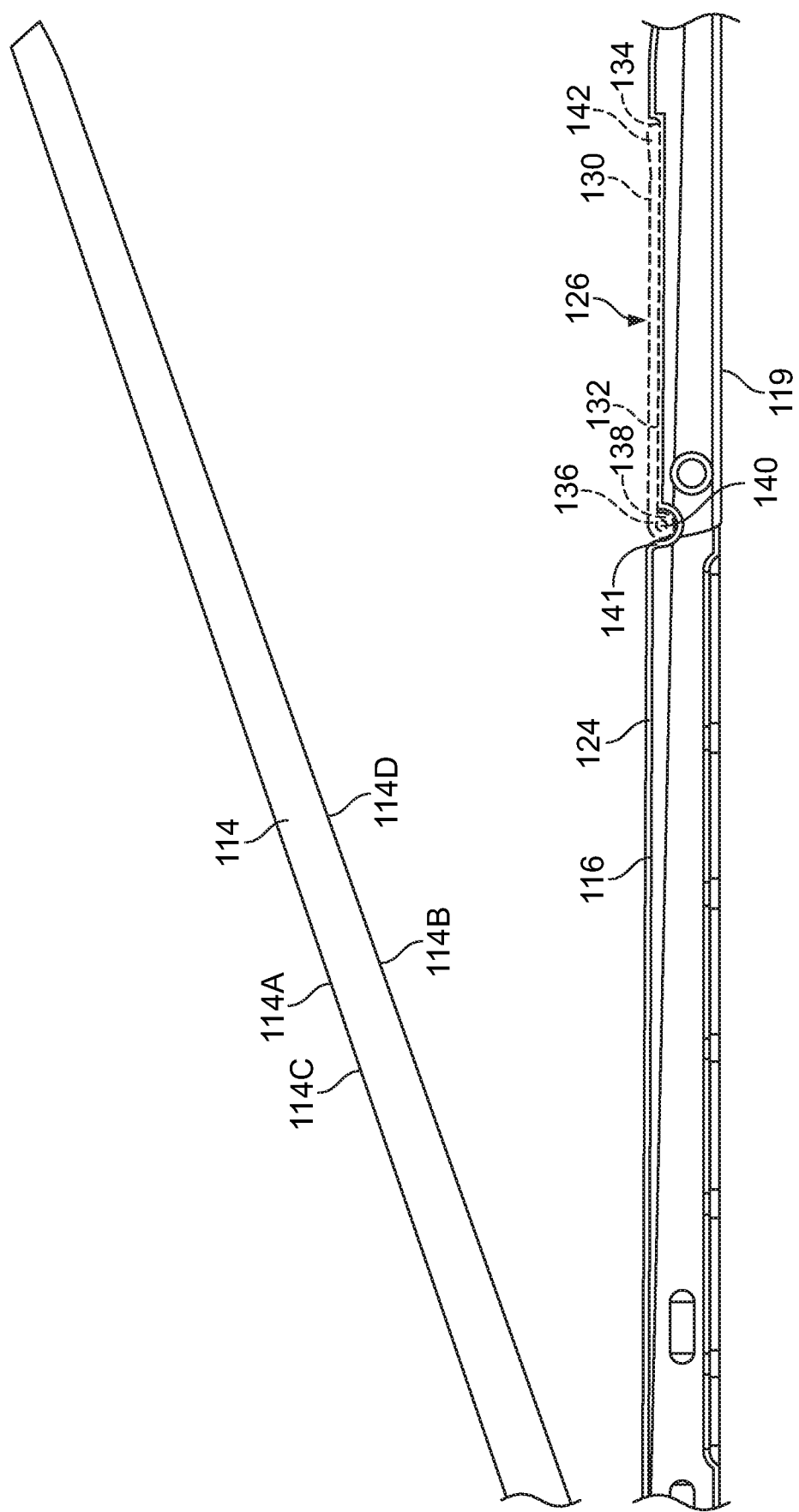
FIG. 1B is a side plan view of an electronic device formed in accordance with embodiments herein.

FIG. 1B illustrates a side plan view of the base 116 when a retractable standoff 126 is in a first, or retracted position where the standoff is shown in hidden-line. The base 116 in one example includes a base bottom surface 124 that receives the standoff 126 therein. In one example, the standoff 126 has a standoff bottom surface 130 that is flush with the base bottom surface 124 when in the retracted position. In another example, the standoff 126 is embedded in the base 116.

The standoff 126 includes a standoff body 132 that extends from a standoff body front edge 134 to a standoff body back edge 136. Each of the standoff body front edge and standoff body back edge are considered a standoff body outer edge. In one embodiment, the standoff body 132 is of one-piece construction and generally is a flat continuous plate. Alternatively, the standoff body 132 is of one-piece construction, however, includes cut-outs within a plate. These cut-outs may be provided for aesthetics, reduce material costs, or the like. In yet another embodiment, the standoff body 132 is of multi-piece construction. In one example, the body includes a first leg, or rod, and a second leg, or rod, that each may move in unison or separate from one another.

A standoff hinge 138 is hingeably mounted to the standoff back edge 136 and disposed within the base 116. The standoff body 132 rotates from the retracted position (FIG. 1B) within the base 116 to a second, or extended position (FIGS. 1A and 1C) from the base 116 about the standoff hinge axis 140. In the extended position, the front edge 134 abuts against the display back surface 114D to fix the display 114 at a predetermined angle relative to the base 116. The predetermined angle may be 20° degrees, or in another embodiment in a range between 15°-35° to place the electronic device 110 in a drawing position.

While described in relation to the base 116, the standoff 126 may similarly be located within the display 114 in the same manner as described. In other embodiments, a standoff portion, such as a leg may be located within the display 114, while another standoff portion, or leg, may be within the base 116. While in the example of FIG. 1B the standoff 126 is located adjacent the base front edge, the standoff may be located adjacent the interface 113 between the display 114 and base 116. Similarly, while the standoff hinge 138 is described as coupled to a standoff body back edge 136 with the standoff body front edge 134 abutting the display back surface 114D, in alternative examples, the standoff hinge 138 is coupled to a standoff body front edge 134, and the standoff body back edge 136 contacts the display back surface 114D. In each embodiment, the standoff 126 may be moveable and rearranged in either the display 114 or base 116 resulting in a standoff outer edge abutting and supporting the display back surface 114D or base bottom surface 124.

Figure 1C:
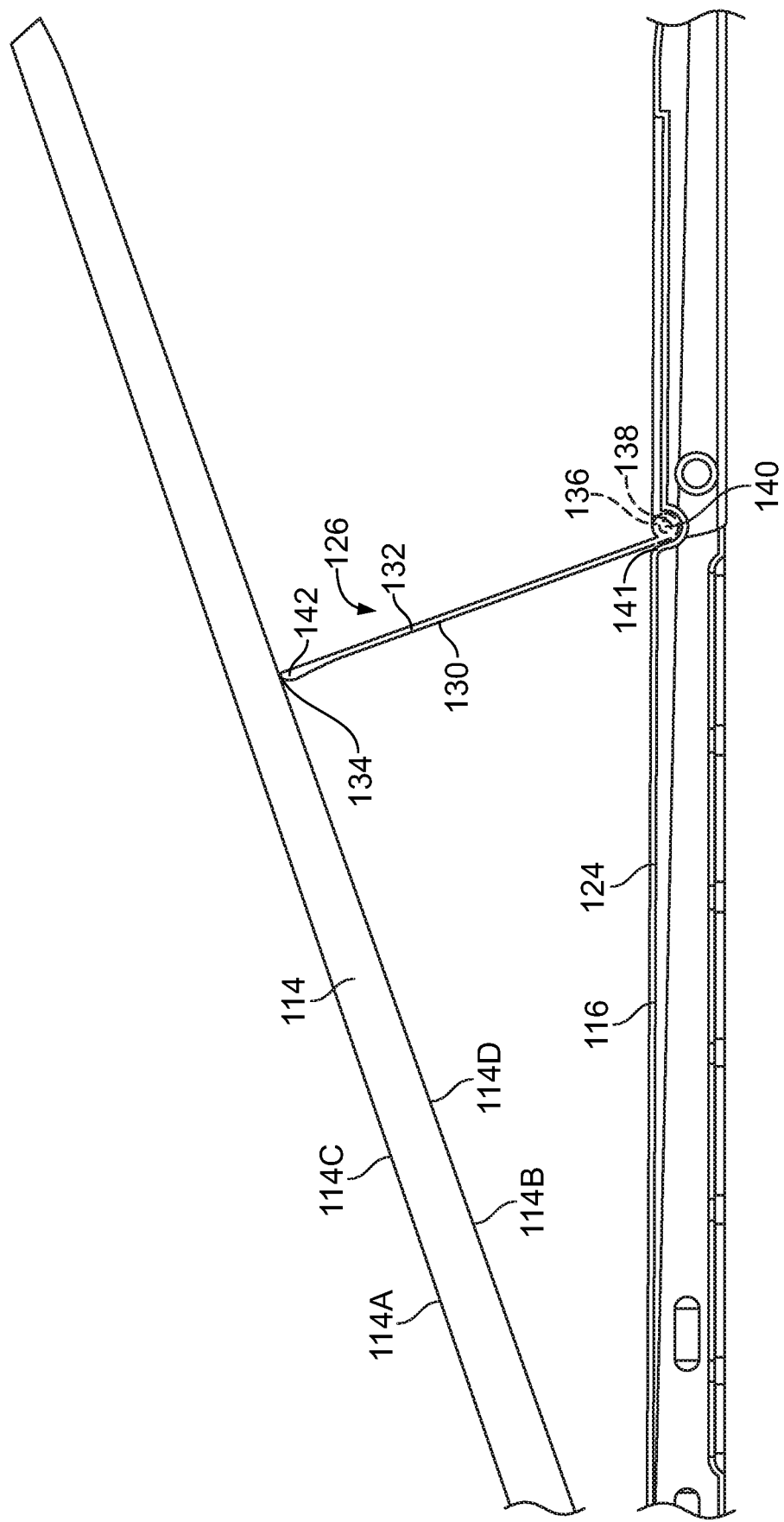
FIG. 1C is a side plan view of an electronic device formed in accordance with embodiments herein.

FIG. 1C illustrates a side plan view of the base 116 when the standoff 126 is in an extended position. As illustrated, the standoff 126 is in an extended position with the standoff body 132 extending from the standoff body front edge 134 to the standoff body back edge 136. The standoff hinge 138 is rotatably coupled to the standoff body back edge 136 and disposed within the base 116. The standoff hinge 138 includes a base detent 141 that holds the standoff hinge at a fixed, predetermined angle. In one example, the pre-determined angle is approximately 20° degrees from the plane of the base 116. In another example, the fixed angle is in a range between 15°-35° degrees from the plane of the base 116. Specifically, this range is to position the display 114 perpendicular to the line of sight of the user. This enhances sketching and writing with a writing utensil 145 by providing less reflections and enhanced brightness when looking at the display 114. Consequently, the user does not have to bend over to sketch, and instead can sit in a normal posture. In another embodiment, a flexible material 142 is disposed along the standoff body front edge 134 to provide cushion and protection from wear when abutting the display back surface 114D. In one example, the flexible material has an elastic modulus that is less than an elastic modulus of material forming the body. In another example the flexible material is rubber.

FIG. 2A illustrates a side perspective view of another exemplary embodiment of an electronic device 200 that includes a base 202 having a retractable standoff 204 to provide support for a display 205 in a drawing position for a user that is approximately at 90 degrees from the line of sight of the user. In this example, the standoff includes a first standoff portion 206 and a second standoff portion 208 that come together to form a tent at a predetermined angle to engage the display back surface 207 to support the display 205 in a drawing position.

The first standoff portion 206 includes a first standoff body portion 212 that in one example is generally a panel that extends from a first standoff body portion back edge 214 to a first standoff body portion front edge 216 where in a retracted position (FIG. 2B) the first standoff body portion back edge 214 is located proximate to the base hinge 217, and the first standoff body portion front edge is located remote from the base hinge 217. While in one embodiment the first standoff body portion 212 is generally a solid panel that is of one-piece construction, in other embodiments the first standoff body portion 212 includes cut-outs to save on materials costs, or provide a more aesthetically pleasing look. In other embodiments, the first standoff body portion 212 is of multipiece construction and may include two separate spaced apart legs.

The first standoff portion 206 includes a first standoff hinge portion 218 that in this example is hingeably mounted and fixed within the base 202 at the first standoff portion front edge 216. The first standoff body portion 212 is rotatable about the first standoff hinge portion 218. The first standoff body portion 212 may be manually rotated about the first standoff hinge portion 218, or may be mechanically rotated. In one example, the first standoff portion in a first, or retracted position (FIG. 2B), has a bottom surface that is flush to the base bottom surface 203. The first standoff portion in a second, or extended position as illustrated in FIG. 2A rotates and may engage the base 202 at a predetermined angle relative to the base 202. Alternatively, the first standoff hinge portion 218 is configured to retain the predetermined angle relative to the base 202 by other mechanical means, including engaging a detent, engaging a stop element, or the like.

The second standoff portion 208 includes a second standoff body portion 232 that in one example is generally a panel that extends from a second standoff body portion back edge 234 to a second standoff body portion front edge 236 that is located proximate to a base distal edge 230 when the second standoff portion 208 is in a retracted position. While in one embodiment the second standoff body portion 232 is generally a solid panel that is of one-piece construction, in other embodiments the first standoff body portion 232 includes cut-outs to save on material costs or provide a more aesthetically pleasing look. In other embodiments, the first standoff body portion 232 is of multipiece construction and may include two separate spaced apart legs.

The second standoff portion 208 includes a second standoff hinge portion 238 that in this example is hingeably mounted and fixed within the base 202 at the second standoff portion back edge 234. The second standoff body portion 232 is rotatable about the second standoff hinge portion. The first standoff body portion 212 may be manually rotated about the second standoff hinge portion 238, or may be mechanically rotated. In one example, the second standoff portion 208 in a first, or retracted position, has a bottom surface that is flush to the base bottom surface 203. The second standoff portion 208 in a second, or extended position rotates and may engage the base 202 at a predetermined angle relative to the base 202. Alternatively, the second standoff hinge portion 238 is configured to retain the predetermined angle relative to the base 202 by other mechanical means, including engaging a detent, engaging a stop element, or the like. Together, the first standoff portion 206 and second standoff portion 208 in extended positions may engage one another and the display. In this manner, the first and second standoff portions 206 and 208 provide supplemental support to one another to support the display 205. In the example, one or both of the first standoff portion 206 and second standoff portion 208 may support the display 205 at a drawing position.

Figure 2B:
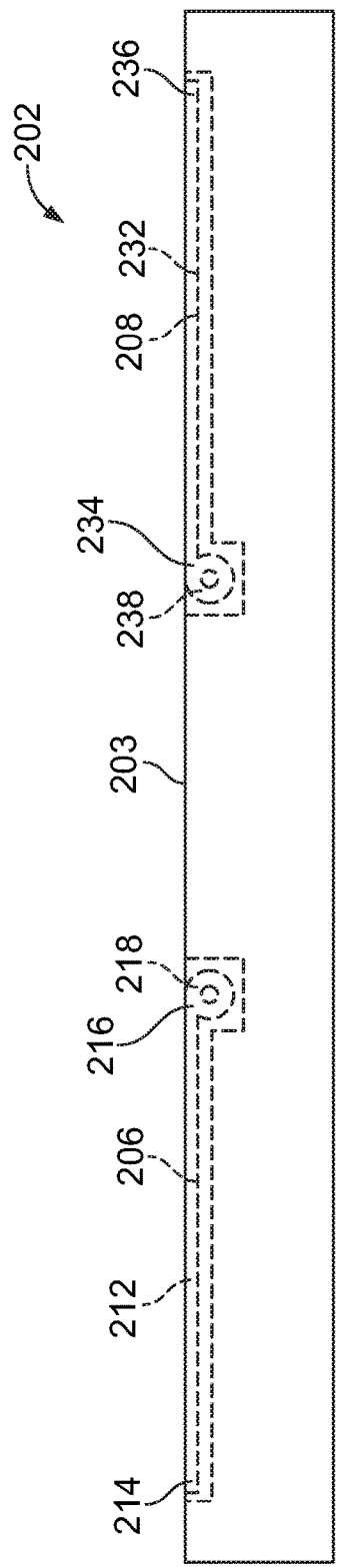
FIG. 2B is a side plan view of an electronic device formed in accordance with embodiments herein.

FIG. 2B illustrates a side plan view of the electronic device of FIG. 2A with the first standoff portion 206 and second standoff portion 208 in a first, or retracted position. In this example, in the retracted position, the first standoff portion bottom surface and the second standoff portion bottom surface are flush with the base bottom surface 203.

Figure 2C:
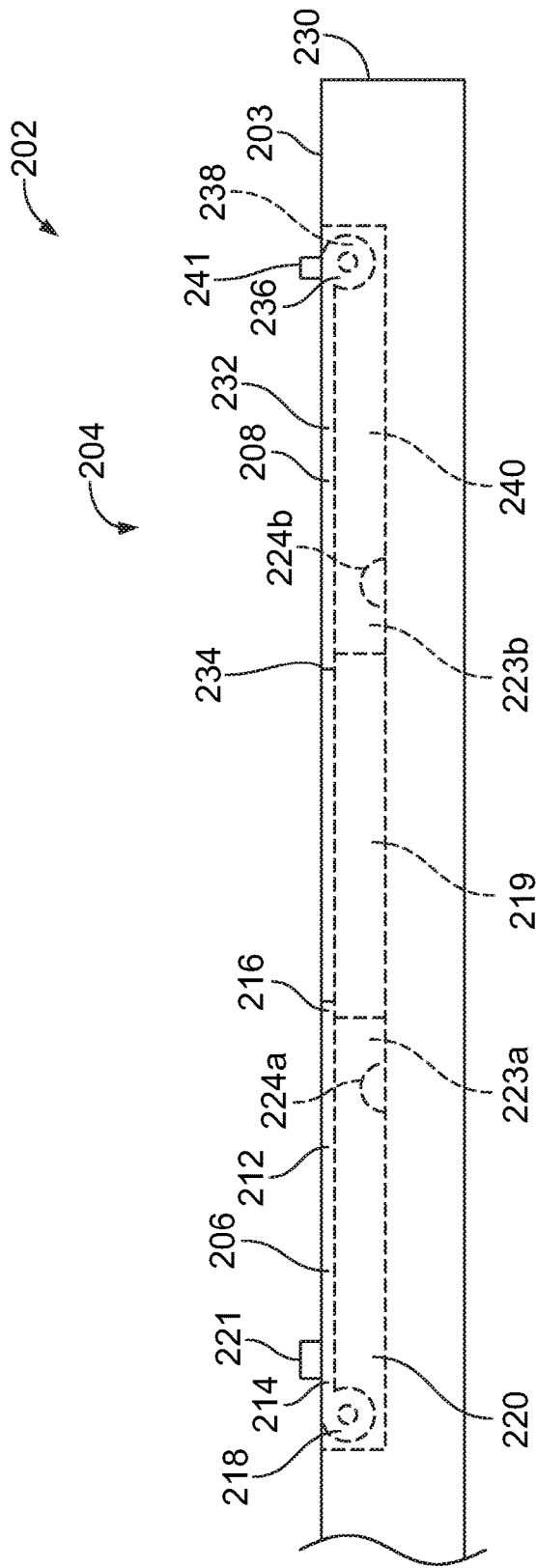
FIG. 2C is a side plan view of an electronic device formed in accordance with embodiments herein.

FIG. 2C illustrates a side plan view of an alternative embodiment of a base 202 of an electronic device 200. In this embodiment, the first standoff portion 206 includes a first standoff hinge portion 218 hingeably mounted at the first standoff portion back edge 214 to allow rotatable movement of the first standoff body portion 212 from a first, or retracted position within the base 202 to a second or extended position extending from the base 202. In one embodiment, in the retracted position as illustrated in FIG. 2C, the first standoff body portion front edge 216 engages and rests on a stepped surface 219 such that the first standoff body portion bottom surface is flush with the base bottom surface 203.

A first track 220 is also disposed within the base 202 and receives the first standoff hinge portion 218 to permit the linear movement of the first standoff hinge portion 218 from a first hinge position adjacent the base hinge, to a second hinge position spaced away from the base hinge. The linear movement in example embodiments may be lateral movement, longitudinal movement, diagonal movement, or the like. In this manner the first standoff body portion 212 may move toward the base hinge 217, away from the base hinge 217, parallel to the base hinge 217, or a combination thereof. The first standoff body portion 212 may include or be coupled to tabs 221 that allow for manual movement of the first standoff hinge portion 218 within the first track 220 from the first hinge position to the second hinge position. Alternatively, a motor that includes an armature may cause the linear movement of the first standoff hinge portion 218, and/or rotational movement of the first standoff hinge 218, such that a button pressed, or an instruction by the user may cause the motor to actuate and cause movement between the first position and second position.

The second standoff portion 208 also includes a second standoff hinge portion 238 hingeably mounted at the second standoff portion front edge 236 to allow rotatable movement of the second standoff body portion 232 from a first, or retracted position within the base 202 to a second, or extended position extending from the base 202. In one embodiment, in the retracted position as illustrated in FIG. 2A, the second standoff body portion back edge 234 engages and rests on the stepped surface 219 such that the second standoff body portion bottom surface is flush with the base bottom surface 203.

A second track 240 is also disposed within the base 202 and receives the second standoff hinge portion 238 to permit the linear movement of the second standoff hinge portion 238 from a first hinge position adjacent the base distal edge 230 or display distal edge 231, to a second hinge position spaced from the base distal edge 230 or display distal edge 231. The linear movement may be lateral movement, longitudinal movement, diagonal movement, or the like. The second standoff body portion 232 may include or be coupled to tabs 221 that allow for manual movement of the second standoff hinge portion 238 within the second track 240 from the first hinge position to the second hinge position. Alternatively, a motor that includes an armature may cause the linear movement of the second standoff hinge portion 238, and/or rotational movement of the second standoff hinge 238, such that a button pressed, or an instruction by the user may cause the motor to actuate and cause movement between the first position and second position.

Figure 2D:
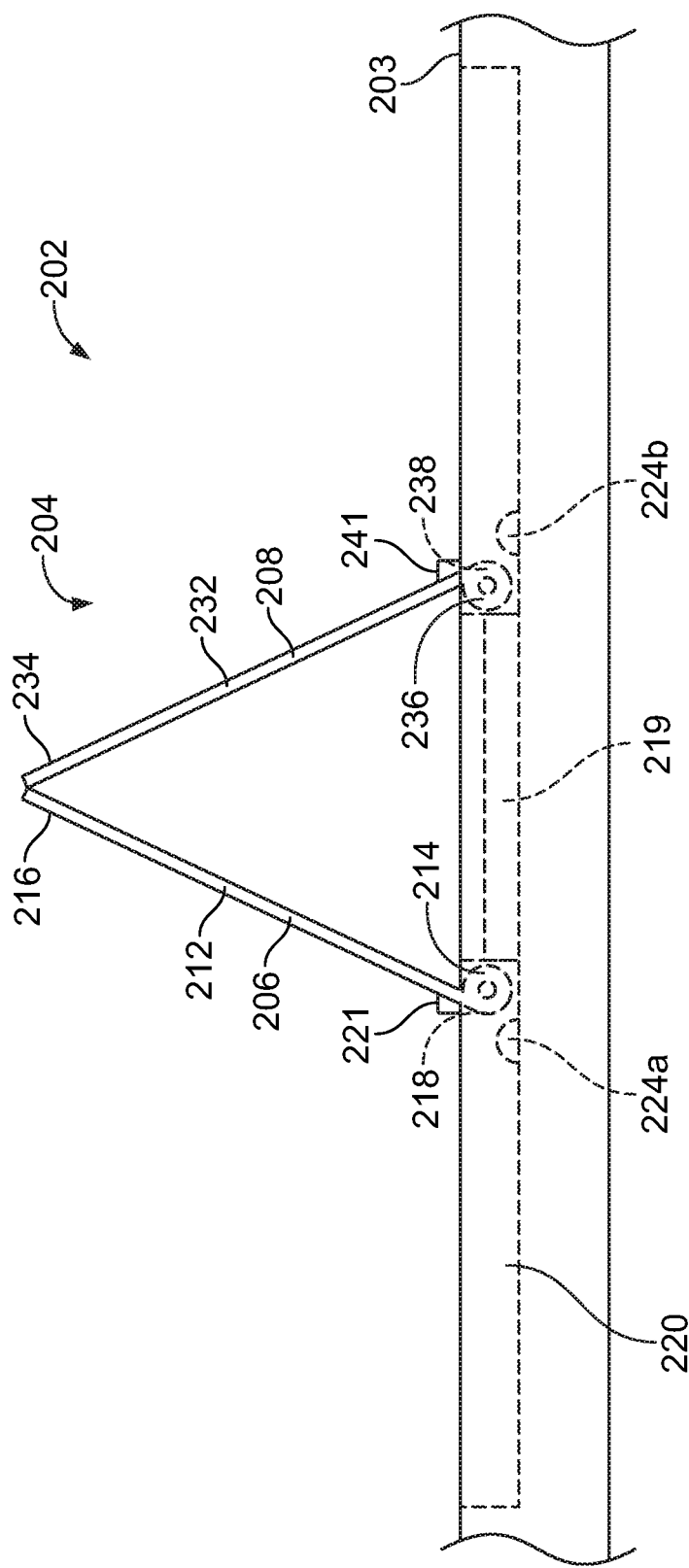
FIG. 2D is a side plan view of an electronic device formed in accordance with embodiments herein.

FIG. 2D illustrates the base 202 of FIG. 2C with the first standoff portion 206 and the second standoff portion 208 both in a second, or extended position. When each standoff portion 206 and 208 are in the extended position, the first standoff portion front edge 216 abuts the second standoff portion back edge 234 to form a tent. Alternatively, the second standoff portion back edge 234 abuts the second standoff portion main body. In yet another example, the first standoff portion 206 and second standoff portion 208 are connected together at a support hinge that causes the first standoff portion 206 and second standoff portion 208 to move in unison toward and away from one another. In each instance, the second standoff portion 208 provides supplemental support to the first standoff portion 206 that abuts the display back surface 207. In one embodiment, the first standoff portion front edge 216 abuts against the display back surface 207 to present an angle between the base 202 and the display that results in the display being approximately perpendicular to the light of sight of a user. In one example, the angle is in a range of between 15°-35° degrees. In another example, the range of angles is between 15°-25° degrees. In yet another example, the angle is approximately 20° degrees. This drawing position provides enhanced comfort for a user, reduces glare and reflection, and improves user posture.

In one example, the first and second standoff hinge portions 218, 238 each include a cam element, ramp element, and/or the like that mechanically actuates the first standoff body portion 212 and/or second standoff body 232 to rotate about each respective standoff hinge portion 218 and/or 238 with the first standoff portion front edge 216 and the second standoff portion back edge 234 each extending upwardly as each standoff hinge portion 218, 238 moves from the retracted position to the extended position. Optionally, the first standoff hinge portion 218 and/or second standoff hinge portion 238 may be positioned and fixed at a predetermined angle as a result of a detent, locking mechanism, engaging a stop element, or the like. At the extended position, the first standoff hinge portion 218 is adjacent the stepped surface 219 and within a first channel 223a formed between the stepped surface 219 and a first detent 224a. The first detent 224a resists linear movement of the first standoff hinge portion 218 from within the first channel 223a to provide additional support to the first standoff portion 206. Similarly, at the extended position, the second standoff hinge portion 238 is adjacent the stepped surface 219 and within a second channel 223b formed between the stepped surface 219 and a second detent 224b. The second detent 224b resists linear movement of the second standoff hinge portion 236 from within the second channel 223b to provide additional support to the second standoff portion 208.

FIG. 3A illustrates yet another embodiment of an electronic device 300 that includes a base 302 that includes a retractable standoff 304 to support a display 305 to provide a drawing position for a user that is approximately as 90 degrees from the line of user sight. In this example, the standoff 304 includes a first standoff portion 306 and a second standoff portion 308 that come together with each providing a support edge at a predetermined angle for supporting the display.

The first standoff portion 306 in a first position is located adjacent the base right edge 309. The first standoff portion includes a first standoff body portion 312 that in one example is generally a rod that extends from right edge 309 to the middle of the base 302. In one embodiment, the first standoff body portion 312 extends and is linearly, laterally movable within a first track 314 that extends from the base right edge 309 to the middle of the base. In an example, the first standoff body portion 312 is a rod that is a standoff hinge that is rotatable about an axis 316. In one example, at the end of the track 314 adjacent the middle of the base 302 is a deflection element 318 (FIG. 3B) that engages the first standoff body portion 312, and as the first standoff body portion 312 is moved toward the middle of the base 302, the first standoff body portion 312 pivots at a pivot point 320 and begins moving upward at a predetermined angle until the first standoff body portion 312 reaches the pivot point 320. In one example, the deflection element is a ramped surface that engages a ramped surface at the end of the first standoff body portion 312 so that the standoff body portion 312 pivots about pivot point 320 and stops moving when the pivot point 320 engages the ramped surface. The extended first standoff body portion 312 as illustrated in FIG. 3A includes a horizontal section 324 and an angled section 326 that extends upwardly at a predetermined angle.

The second standoff portion 308 in a first, retracted position (FIG. 3B) is located adjacent the base left edge 338. The second standoff portion 308 includes a first standoff body portion 312 that in one example is generally a rod that extends from left edge 338 to the middle of the base 302. In one embodiment, the second standoff body portion 342 extends within a second track 344 that extends from the left edge 338 to the middle of the base 302. In an example, the second standoff body portion 342 is a rod that is a standoff hinge that is rotatable about the axis 316. In one example, at the end of the second track 344 adjacent the middle of the base 302 is a deflection element 318 (FIG. 3B) that engages the second standoff body portion 342. As the second standoff body portion 342 is moved toward the middle of the base 302, the second standoff body portion 342 pivots at a pivot point 350 and begins moving upward at a predetermined angle until the second standoff body portion 342 reaches the pivot point 350. In one example the deflection element is a ramped surface that engages a ramped surface at the end of the second standoff body portion 342 so that the second standoff body portion 342 pivots about pivot point 350 and stops moving when the pivot point 350 engages the ramped surface. The extended second standoff body portion 342 as illustrated in FIG. 3A includes a horizontal section 354, and an angled section 356 that extends upwardly at a predetermined angle.

When the first standoff portion 306 and second standoff portion 308 are each in a second, extended position as illustrated in FIG. 3A they engage. Specifically, the first standoff portion angled section 326 contacts, or engages, the second standoff portion angled section 356 to form a combined support edge 358 that engages the display back surface 307. In one example, the first and second standoff portion contacting ends interlock with one another. In another example, the first and second standoff portions 306 and 308 are both made of a magnetic material that secures the first and second standoff portion ends together at the support edge 358. In yet another example, the first standoff portion 306 is connected to the second standoff portion 308 at a support hinge and the first standoff portion 306 and second standoff portion 308 may move in unison.

The support edge 358 when formed, abuts against the display back surface 307 to provide support to the display at a predetermined angle. In one example, the angle is in a range of between 15°-35° degrees. In another example the range of angles is between 15°-25° degrees. In yet another example, the angle is approximately 20 degrees. This drawing position provides enhanced comfort for a user, reduces glare and reflection, and improves user posture.

Figure 3B:
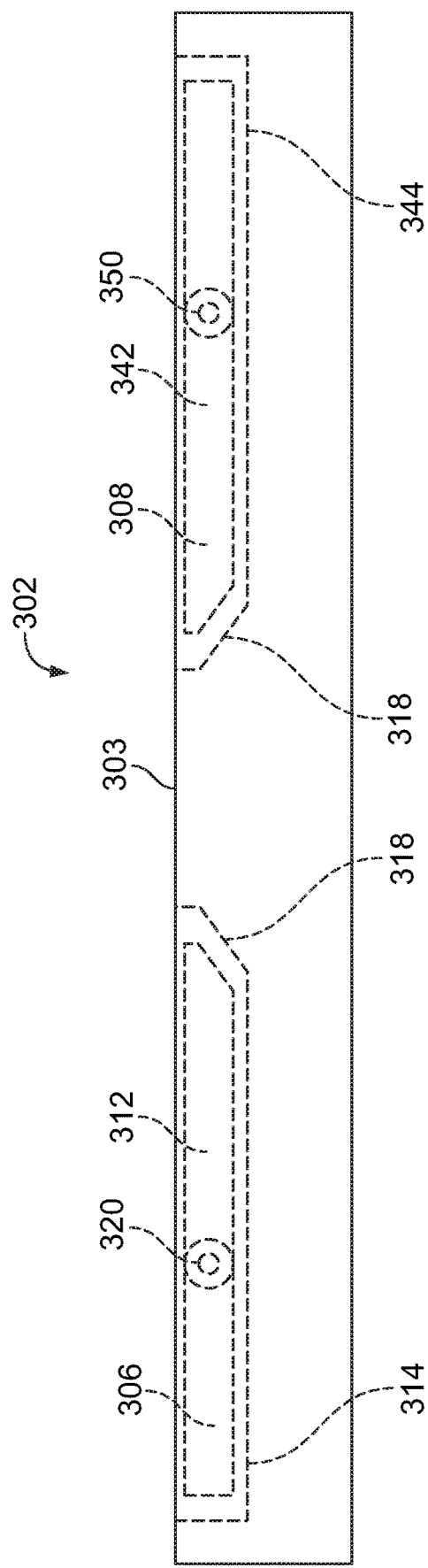
FIG. 3B is a front plan view of an electronic device formed in accordance with embodiments herein.

FIG. 3B illustrates a plan view of the base 302 of the electronic device 300 of FIG. 3A when the first portion standoff 306 and second portion standoff 308 are both in a first, or retracted position. In one embodiment, in the retracted position, the first portion standoff bottom surface is flush with the base bottom surface 303, and the second portion standoff bottom surface is flush with the base bottom surface 303. In another embodiment, the first portion standoff 306 and second portion standoff 308 are embedded in the base 302. In another embodiment, the first portion standoff bottom surface and second portion standoff bottom surface include roughened or friction surfaces to facilitate manual movement of the first portion standoff 306 and second portion standoff 308. Alternatively, each portion standoff 306 and 308 may be mechanically moved.

In the embodiments described above, a standoff is provided that is within either a base or display. The standoff may be moveable, rotatable, in one piece, in multipiece, in engaging portions, and the like to provide a support for the display at a predetermined angle to the base that facilitates drawing and sketching. As a result, a user obtains additional functionality from the electronic device.

Figure 4:
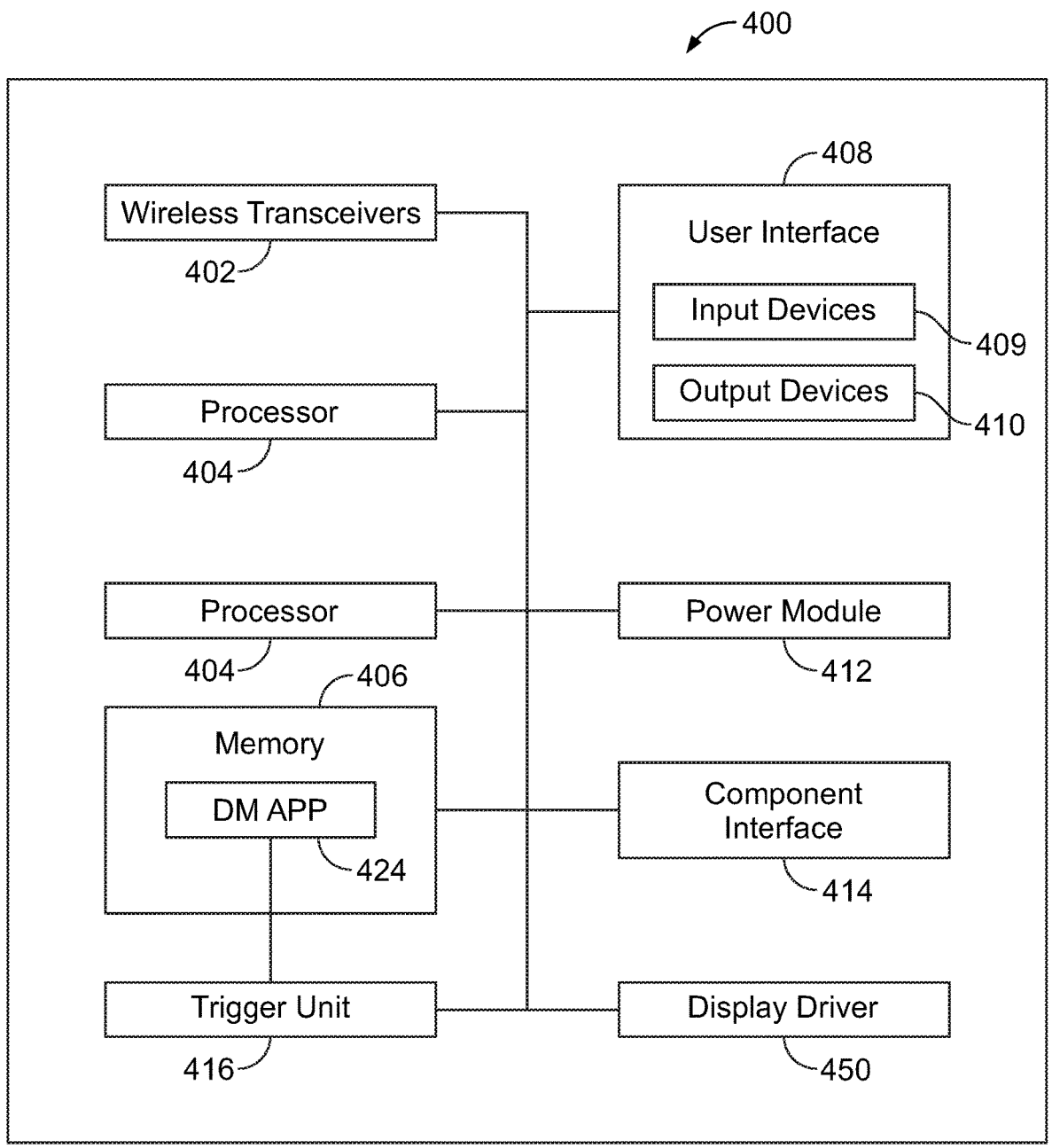
FIG. 4 illustrates a block diagram of an electronic device formed in accordance with embodiment herein.

FIG. 4 illustrates a simplified block diagram of internal components of the electronic device 400 configured in accordance with embodiments herein. In one example, the electronic device is electronic device 110, 200, and/or 300 of FIGS. 1A-3B. The electronic device 400 includes components such as one or more wireless transceivers 402, one or more processors 404 (e.g., a microprocessor, microcomputer, application-specific integrated circuit, etc.), one or more local storage medium (also referred to as a memory) 406, a user interface 408 which includes one or more input devices 409 and one or more output devices 410, a power module 412, a component interface 414 and a trigger unit 416. All of these components can be operatively coupled to one another, and can be in communication with one another, by way of one or more internal communication links, such as an internal bus. The trigger unit 416 may determine the position, or display angle compared to the base of the electronic device and activate a drawing mode, including drawing options associated with drawing.

The input and output devices 409, 410 may each include a variety of visual, audio, and/or mechanical devices. For example, the input devices 409 can include a motion sensor or proximity sensor for detecting the position of a base relative to a display, visual input device including an optical sensor or camera, an audio input device including a microphone, and a mechanical input device including a keyboard, keypad, selection hard and/or soft buttons, switch, touchpad, touch screen, icons on a touch screen, a touch sensitive areas on a touch sensitive screen and/or any combination thereof. Similarly, the output devices 410 can include a visual output device, one or more light emitting diode indicators, an audio output device such as a speaker, alarm and/or buzzer, a mechanical output device including a vibrating mechanism, or the like. The display may be touch sensitive to various types of touches and gestures.

The transceiver 402 can utilize a known wireless technology for communication. Exemplary operation of the wireless transceivers 402 in conjunction with other components of the device 400 may take a variety of forms and may include, for example, operation in which, upon reception of wireless signals, the components of device 400 detect communication signals from secondary devices and the transceiver 402 demodulates the communication signals to recover incoming information, such as responses to inquiry requests, voice and/or data, transmitted by the wireless signals. The processor 404 formats outgoing information and conveys the outgoing information to one or more of the wireless transceivers 402 for modulation to communication signals. The wireless transceiver(s) 402 convey the modulated signals to a remote device, such as a cell tower or a remote server (not shown).

The memory 406 can encompass one or more memory devices of any of a variety of forms (e.g., read only memory, random access memory, static random access memory, dynamic random access memory, etc.) and can be used by the processor 404 to store and retrieve data. The data that is stored by the memory 406 can include, but need not be limited to, operating systems, applications, user collected content and informational data. Each operating system includes executable code that controls basic functions of the device, such as interaction among the various components, communication with external devices via the wireless transceivers 402 and/or the component interface 414, and storage and retrieval of applications and data to and from the memory 406. Each application includes executable code that utilizes an operating system to provide more specific functionality for the communication devices, such as file system service and handling of protected and unprotected data stored in the memory 406.

A drawing management (DM) application 424 is stored in the memory 406, and receives inputs from the trigger unit 416. The DM application 424 includes program instructions accessible by the one or more processors 404 to direct a processor 404 to implement the methods, processes, and operations described herein including, but not limited to the methods, processes, and operations illustrated in the Figures and described in connection with the Figures. The DM application 424 manages operation of the processor 404, a display driver 450 and/or a video card in connection with displaying desired content on the viewing region of the display.

In accordance with at least one embodiment, the DM application receives inputs from at least one input device 409, and triggering unit 416 that are evaluated to determine predetermined conditions, including the angle between the base and the display, actuation of a standoff, or a combination thereof. Based on the determination of one or more of these predetermined conditions, the DM application 424 directs the processor to switch to a desired mode. In accordance with at least one embodiment, the processor displays one or more of a tablet mode, a drawing mode, a sketch mode, drawing inputs including a graphic user interface, paintbrush, colors, shapes, and size, or the like.

In another example, an input is a manual input either through the touch screen display, or via a keyboard, mouse, or the like, wherein an individual may manually request a drawing mode, sketch mode, tablet mode, or the like. In response to the manual input, the DM application 424 directs actuation of a motor to move a standoff from a retracted position to an extended position. This may occur as a result of upward movement about a rotatable axis, longitudinal movement within a track, lateral movement within a track, or the like. The standoff provides support for the display and the DM application may place the electronic device into a drawing mode, sketch mode, tablet mode, or the like.

Provided is an electronic device that includes a standoff for providing drawing mode for a user. The standoff positions the display and base of the electronic device relative to one another to provide a right angle to the line of sight to the display for a user. Not only does this eliminate reflections, but provides for better hand placement, posture, and the like. The electronic device also monitors when the device is being placed into the drawing mode to provide a smooth and fast transition to the drawing mode for the user.

Closing Statements

Before concluding, it is to be understood that although e.g., a software application for undertaking embodiments herein may be vended with a device such as the electronic devices 110, 200, 300, and 400 embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, if a claim limitation recited "utilizing one or more of the wireless activity and timestamp", such limitation means and shall encompass i) "utilizing the wireless activity", ii) "utilizing the timestamp" and/or iii) "utilizing both the wireless activity and the timestamp".

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
   a display including a display surface and an opposed display back surface;
   a base rotatably coupled to the display with a base hinge, the base including an input surface and an opposed base bottom surface;
   the base hinge extending along an interface between the display and the base; and
   a retractable standoff comprising:
      a standoff body having a standoff hinge to hingeably mount the standoff body to one of the display back surface or base bottom surface;
      the standoff hinge moveable between a retracted position and extended position, the standoff body flush with the display back surface or the base bottom surface when the retractable standoff is in the retracted position;
      the standoff body including a standoff body outer edge to abut against another of the display back surface or the base bottom surface when the retractable standoff is in the extended position;
   wherein the standoff body includes a first standoff portion and second standoff portion;
   wherein the second standoff portion is configured to abut against the first standoff portion when in the extended position;
   wherein the standoff hinge includes first and second standoff hinge portions, and the standoff body outer edge includes first and second standoff body outer edges; and the second standoff hinge portion hingeably mounting the second standoff portion to one of the display back surface or base bottom surface; and
   wherein the first standoff hinge portion is linearly moveable toward and away from the base hinge and the second standoff hinge portion is linearly moveable toward and away from the base hinge.

2. The electronic device of claim 1, wherein the second standoff portion is embedded within the display back surface or the base bottom surface when the retractable standoff is in the retracted position.

3. The electronic device of claim 1, wherein the standoff body outer edge includes a flexible material that abuts against the another of the display back surface or base bottom surface; wherein the flexible material has an elastic modulus that is less than an elastic modulus of material forming the standoff body.

4. The electronic device of claim 3, wherein the flexible material is rubber.

5. The electronic device of claim 1, wherein in the extended position the standoff body outer edge abuts against the another of the display back surface or the base bottom surface to form an angle between the display and the base in a range between 15°-35° degrees.

6. The electronic device of claim 1, wherein the display back surface or the base bottom surface includes a detent to receive the standoff body outer edge.

7. The electronic device of claim 1, further comprising:
   at least one sensor positioned to detect an angle between the base and the display;
   one or more processors coupled to the at least one sensor to receive angle data from the at least one sensor;
      wherein, responsive to execution of the program instructions, the one or more processors perform:
         in response to angle data indicative of the angle between the base and display being within a predetermined range, activating a sketch application.

8. The electronic device of claim 7, wherein the predetermined range is between 15 degrees and 35 degrees.

9. The electronic device of claim 1, further comprising:
   at least one sensor positioned to detect contact between the retractable standoff and the another of the display back surface or the base bottom surface;
   one or more processors coupled to the at least one sensor to receive contact data from the at least one sensor;
      wherein, responsive to execution of the program instructions, the one or more processors perform:
         in response to contact data indicative of the another of the display back surface or the base bottom surface contacting the retractable standoff, activating a sketch application.

10. The electronic device of claim 1, further comprising:
    a first track disposed within one of the base or the display that receives the first standoff portion to permit linear movement of the first standoff portion parallel to the base hinge; and
    a second track disposed within one of the base or the display that receives the second standoff portion to permit linear movement of the second standoff portion parallel to the base hinge.

11. An electronic device for sketching comprising:
    a display including a display surface and an opposed display back surface;
    a base rotatably coupled to the display with a base hinge and including an input surface and an opposed base bottom surface;
    the base hinge extending along an interface between the display and base; and
    a retractable standoff comprising:
       a first standoff portion positioned adjacent the base hinge; the first standoff portion including a first standoff body portion having a first standoff hinge portion hingeably mounted in one of the base or the display to move the first standoff portion from a retracted position to an extended position;
       a second standoff portion positioned adjacent a base distal edge or display distal edge, the second standoff portion including a second standoff body portion having a second standoff hinge portion hingeably mounted in one of the base or the display to move the second standoff portion from a retracted position to an extended position;
    wherein the first standoff portion in the extended position to engage the second standoff portion in the extended position to fix the first standoff portion as a predetermined angle;
    the first standoff portion including a first standoff portion outer edge to abut against another of the display back surface or the base bottom surface;
    a first track disposed within one of the base or the display that receives the first standoff portion to permit linear movement of the first standoff portion parallel to the base hinge; and
    a second track disposed within one of the base or the display that receives the second standoff portion to permit linear movement of the second standoff portion parallel to the base hinge.

12. The electronic device of claim 11, further comprising tabs secured to the first standoff portion for manual actuation of the first standoff portion within the track.

13. The electronic device of claim 11, further comprising:
one or more processors that execute directions to:
  determine the standoff is in an extended position;
  switch a mode of operation of the electronic device to a drawing mode.

14. The electronic device of claim 13, the one or more processors that execute directions to:
  in response to switching the mode of operation to a drawing mode, display a graphic user interface.

15. An electronic device for sketching comprising:
  a display including a display surface and an opposed display back surface;
a base rotatably coupled to the display with a base hinge and including an input surface and an opposed base bottom surface;
  the base hinge extending along an interface between the display and the base; and
  a retractable standoff comprising:
    a first standoff portion positioned adjacent the base hinge including a first standoff body portion having a first standoff hinge portion rotatably coupled in one of the base or the display to move from a retracted position to an extended position;
    a second standoff portion positioned adjacent a base distal edge or a display distal edge including a second standoff body portion having a second standoff hinge portion rotatably coupled in one of the base or the display to move from a retracted position to an extended position;
  wherein, the first standoff portion in the extended position engages the second standoff portion in the extended position to fix the second standoff portion at a predetermined angle;
  the second standoff portion including a second standoff portion outer edge to abut against another of the display back surface or the base bottom surface in the extended position; and
  a first track disposed within one of the base or the display that receives the first standoff portion to permit linear movement of the first standoff portion parallel to the base hinge; and
  a second track disposed within one of the base or the display that receives the second standoff portion to permit linear movement of the second standoff portion parallel to the base hinge.

16. The electronic device of claim 15, further comprising:
one or more processors that execute directions to:
  determine the first standoff portion is in an extended position;
  switch a mode of operation of the electronic device to a drawing mode based on the determination the first standoff portion is in the extended position.

17. The electronic device of claim 15, wherein the first standoff portion moves laterally in relation to the second standoff portion parallel to the base hinge.

* * * * *